March 17, 1925.                                          1,530,449
                        A. F. WELCH
                       ELECTRIC MOTOR
                     Filed March 28, 1922
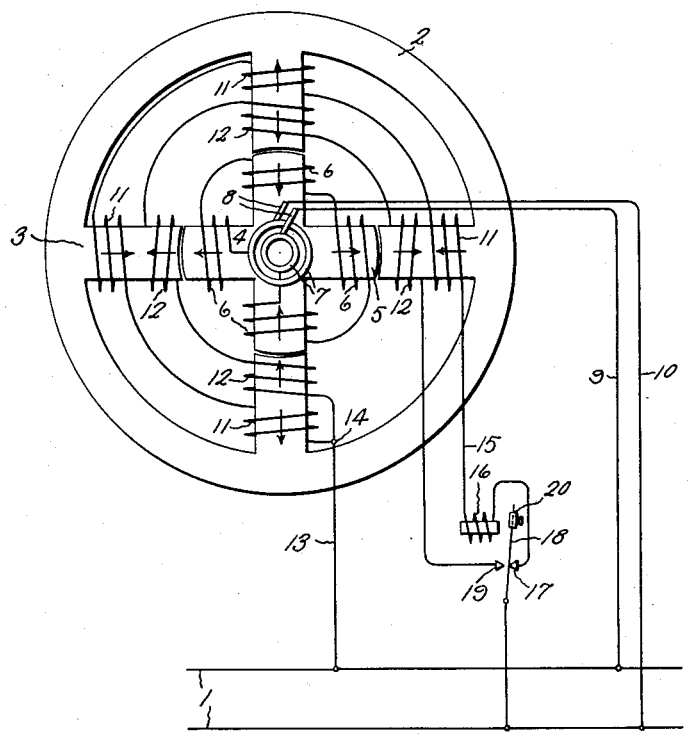
                                              Inventor:
                                          Alfred F. Welch,
                                        by *Albert G. Davis*
                                              His Attorney.

Patented Mar. 17, 1925.

1,530,449

UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

ELECTRIC MOTOR.

Application filed March 28, 1922. Serial No. 547,473.

*To all whom it may concern:*

Be it known that I, ALFRED F. WELCH, a citizen of the United States, residing at Fort Wayne, county of Allen, State of Indiana, have invented certain new and useful Improvements in Electric Motors, of which the following is a specification.

This invention relates to an electric motor adapted to be driven either from a source of alternating current or direct current and adapted to be adjustable in speed. The motor that I have invented is particularly applicable to small sizes, such, for example, as phonograph motors.

One of the objects of my invention is to utilize an adjustable vibrating blade for varying the speed of the motor. Another object is to provide a motor having a minimum number of parts and mechanically capable of performing the work required of it. Other objects and advantages will be apparent as the description proceeds.

The single figure of the drawing represents the structure, and the connections to be used with my motor.

Referring now in detail to the drawing, 1—1 represents the source of supply, either alternating current or direct current. A field frame 2, preferably circular in shape, is provided having a plurality of inwardly projecting pole pieces 3 shown in this particular case as 4 in number. This field frame 2 is stationary. The revolving part of the motor consists of an armature spider 4 provided with polar projections 5 agreeing in number and spacing with the poles 3 on the field frame 2. Both the field frame 2 and the armature spider 4 are made of magnetic material. Should the motor be operated from a source of alternating current, both of these parts may be laminated so as to minimize eddy current and hysteresis losses; otherwise it is necessary to laminate the field frame 2 only.

Upon polar projections 5 of the rotating element 4 there are provided coils 6, in this case shown as connected in series and supplied from the mains 1—1 through the collector rings 7 upon which bear brushes 8 connected by wires 9 and 10 to the source of supply. The coils are so wound on this element as to produce alternate polarities on the polar projections 5, at any given instant. The poles 3 on the field frame 2 are each provided with two oppositely wound exciting coils 11 and 12. The coils 11 are so wound upon the poles 3 as to produce alternately opposite polarities at any given instant, as indicated by the arrows. The coils 12 are so connected as to produce a magnetomotive force always opposite in direction to that produced by the coils 11. The coils 11 are shown as connected in series but any other kind of connection may obviously be used. The coils 12 are likewise connected in series. A common terminal 14 for both of the sets of coils 11 and 12 serve to connect one of the terminals of each of these sets to one of the mains 1 by means of the wire 13. The other terminal of the set of coils 11 is connected by a wire 15 to a vibrator coil 16. The other terminal of this coil is connected to a back contact 17 of the vibrating blade 18. The blade 18 is permanently connected to the opposite main 1 of the source of supply. A front contact 19 of the vibrator is connected to the remaining terminal of the set of coils 12. A small adjustable weight 20 is carried by the vibrating blade 18. This weight can be moved along the length of the blade 18 so as to vary the period of vibration of said blade.

The mode of operation of this motor may now be readily understood. When the vibrator is in the position shown the set of coils 11 are energized from the mains while the set of coils 12 are deenergized. At the same time the vibrator coil 16 is energized, as well as the coils 6 on the rotating armature. The polarities produced in the armature and field are so related as to cause relative rotation between them, as is well understood. However, this connection exists but for a small length of time, since the coil 16 attracts the vibrating blade 18 and breaks the connection for the set of coils 11. When this occurs the front contact 19 engages with the blade 18 and the oppositely wound set of coils 12 are energized producing opposite polarities on the field projections 3. It is evident that if the rotating armature 4 has rotated to such a position as to present opposite poles to the polar projections than were presented while the set of coils 11 were energized, an exactly similar impulse as before will be obtained. The rate of vibration of blade 18 determines the rate of rotation of the motor. As has been shown, this variation is accomplished by the adjustable weight 20. Should the motor once be started to rotate synchronously it will continue to do so due to the continued magnetic coaction between the stationary polar projections 3 and the rotating polar projections 5. The same mode of operation exists when an alternating current source is used, except that periodically all polarities are changed.

The structure as described above is extremely simple as is self-evident and it is an extremely easy matter to adjust the speed of the motor. There are few parts and it has been found that a motor built upon this principle has operating characteristics making it especially valuable for the operation of small apparatus such as phonographs.

While I have shown in the accompanying drawing the preferred embodiment of my device, my invention is not limited thereto, and I aim in the appended claims to embrace all modifications falling fairly within the scope of my invention.

What I claim as new and desire to secure by Letters Patent of the United States, is,—

1. An electric motor comprising an armature having definite magnetic poles, a field frame relatively rotatable therewith and having definite poles, two sets of exciting coils on said field frame arranged to be alternately energized and vibratory controlling means for alternately energizing said sets of coils.

2. An electric motor comprising an armature having definite magnetic poles, a field frame relatively rotatable therewith having definite magnetic poles, two exciting circuits on said field frame arranged to be alternately energized and vibratory controlling means for alternately energizing said circuits.

3. An electric motor comprising a member having definite poles, a field frame relatively rotatable therewith having poles, a pair of exciting coils for each pole of said field frame for producing opposite magnetomotive forces thereon, the coils wound in one direction forming one set, and the coils wound in the other direction another set, a switch having two positions for respectively energizing said sets, and means for rapidly vibrating said switch between said two positions.

4. An electric motor comprising a member having definite poles, a field frame relatively rotatable therewith and having poles, two sets of exciting coils for the poles on said field frame for producing opposite magnetomotive forces thereon, means adapted alternately to energize first one of the sets of coils, and then the other of said sets, and means for varying the rate at which the sets are alternately energized for regulating the speed of the motor.

5. An electric motor comprising an armature, a field frame relatively rotatable therewith and having poles, two sets of exciting coils for said poles for producing opposite magnetomotive forces thereon, and vibratory controlling means for alternately energizing said sets of coils.

6. An electric motor comprising an armature, a field frame relatively rotatable therewith and having poles, two sets of exciting coils for said poles for producing opposite magnetomotive forces thereon, vibratory controlling means for alternately energizing said sets of coils, and means for varying the rate of vibration of said controlling means.

7. An electric motor comprising a rotatable armature having a plurality of polar projections, coils wound on said projections, a stationary field frame having polar projections, a pair of exciting coils for each of said field polar projections for producing opposite magnetomotive forces thereon, the coils wound in one direction forming one set, and the coils wound in the other direction forming another set, a blade of resilient material, having a front and back contact, one of said contacts and the blade being in circuit with one of the sets of coils, and the other of said contacts and the blade in circuit with the remaining set, a coil in circuit with one of said sets of exciting coils for vibrating said blade, and an adjustable weight carried by said blade for varying its period of vibration, whereby the speed of the motor is varied.

In witness whereof, I have hereunto set my hand this 25 day of March, 1922.

ALFRED F. WELCH.